No. 765,581. Patented July 19, 1904.

UNITED STATES PATENT OFFICE.

PAUL JULIUS AND SIEGFRIED HAECKEL, OF LUDWIGSHAFEN-ON-THE-RHINE, GERMANY, ASSIGNORS TO BADISCHE ANILIN UND SODA FABRIK, OF LUDWIGSHAFEN-ON-THE-RHINE, GERMANY, A CORPORATION OF BADEN.

AZO DYE AND PROCESS OF MAKING SAME.

SPECIFICATION forming part of Letters Patent No. 765,581, dated July 19, 1904.

Application filed September 29, 1903. Serial No. 175,068. (No specimens.)

*To all whom it may concern:*

Be it known that we, PAUL JULIUS, a subject of the Emperor of Austria-Hungary, and SIEGFRIED HAECKEL, a subject of the King of Prussia, German Emperor, both doctors of philosophy and chemists, both residing at Ludwigshafen-on-the-Rhine, in the Kingdom of Bavaria, Empire of Germany, have invented new and useful Improvements in Azo Coloring-Matters and Processes of Making the Same, of which the following is a specification.

The ultimate object of this invention is the production of azo dye of the naphthalene series which gives black shades on wool when after dyeing in the usual way from an acid-bath the material is subsequently treated with a chromate or a mixture of a chrome salt and a chromate.

To obtain the new azo dye, the acetyl compound of 2.4-dichlor-1-naphthylamin is treated with fuming sulfuric acid. Then the acetyl group is split off and a new 2.4-dichlor-1-naphthylamin sulfo-acid is obtained. If this new monosulfo-acid be diazotized, a diazo compound is obtained which can be recognized by testing it with a solution of resorcinol made alkaline with carbonate of soda in that under these conditions a yellowish-red azo coloring-matter is obtained; but if this new diazo compound before coupling with the resorcinol be treated with a solution of a body that binds mineral acids—such as, for instance, sodium acetate or the carbonates of the alkalies or alkaline earths—then the diazo compound is changed to a different one, which on testing with the soda-alkaline resorcinol solution yields a deep violet coloring-matter. Similarly, the diazo compound first obtained gives a red dye with beta-naphthol; but the diazo compound obtained after treatment with the reagents defined yields with beta-naphthol a dyestuff which is soluble in water, giving a brilliant blue solution, which dyes wool from the acid-bath in the first place brown-violet shades which upon treatment with bichromate of potash or a mixture of a chromate and a chromium salt in the known manner are converted into a deep blue-black with a beautiful "overhand" appearance. The wool thus dyed possesses to an excellent degree the character of fastness against the action of washing, milling, potting, and light.

In all probability the chemical change which takes place when the diazo compound first obtained is treated with the reagents capable of binding mineral acids mentioned is that a hydroxyl group is substituted for one atom of chlorin, so that the dichlor-diazo-naphthalene sulfo-acid is converted into a hydroxy-chlor-diazo-naphthalene sulfo-acid, and this may or may not lose water and an internal anhydrid be formed, or the anhydrid may be formed directly without the intermediate formation of the hydroxy-chlor-diazo-naphthalene sulfo-acid; but, as will readily be understood by chemists, for this invention it is a matter of equivalence whether the hydroxy-diazo compound or its internal anhydrid be formed. The use of this diazo compound therefore results in the formation of 2-hydroxy-1-azo coloring-matter of the naphthalene series. By this invention, therefore, an entirely new class of coloring-matter which possesses the valuable property of yielding very fast shades when treated with chromates has been produced.

The following examples will serve to further illustrate the nature of this invention; but it is not confined to these examples. The parts are by weight.

*Example 1—Production of 2.4-dichlor-1-naphthylamin sulfo-acid.*—Add two hundred and fifty-four (254) parts of 2.4-dichlor-1-acetamido-naphthalene to fourteen hundred and twenty-five (1425) parts of fuming sulfuric acid, containing twenty-three (23) per cent. of free anhydrid, ($SO_3$.) Stir the mixture during the addition and subsequently and so regulate the temperature that it at no time exceeds forty-five degrees centigrade, (45° C.) Take tests from time to time and continue the operation until a test portion is completely soluble in a dilute solution of carbonate of soda. When this point is reached, pour the whole mass into eight thousand (8,000) parts of water and boil the solution for about two or three (2-3) hours, replacing the water that evaporates. By this treatment the acetyl group is split off, 2.4-dichlor-1-naphthylamin sulfo-acid separates out, while the mixture is still hot, in the form of a colorless powder, which is but slightly soluble in water. The sodium salt of the new acid crystallizes in colorless leaflets. The zinc and magnesium salts can be obtained in long needles.

*Example 2—Preparation of the diazo-dichlor-naphthylamin sulfo-acid and its conversion into diazo-hydroxy-chlor-naphthylamin sulfo-acid.*—Dissolve two hundred and ninety-two (292) parts of 2.4-dichlor-1-naphthylamin sulfo-acid, such as can be obtained according to Example 1, in water, to which the requisite quantity of soda is added. Add seventy (70) parts of sodium nitrite in aqueous solution and then diazotize by the addition of about four hundred and fifty (450) parts of hydrochloric acid, containing about thirty-seven (37) per cent. of HCl. The dichlor-diazo-naphthylamin sulfo-acid is quickly formed and for the most part separates out in the form of a pale yellow crystalline precipitate. To convert this product into the desired diazo-chlor-hydroxy-naphthylamin sulfo-acid, add sufficient carbonate-of-soda solution to make the whole strongly alkaline and heat this mixture to a temperature of about sixty degrees centigrade (60° C.) until a clear yellow solution has been obtained which yields no yellow-red dye on combination with soda-alkaline resorcinol solution, but a deep violet color. The solution thus obtained contains the desired hydroxy-diazo compound, and it can at once be used in the manufacture of the chrome dyes.

Instead of soda other compounds which bind mineral acids can be employed—for instance, magnesia, chalk, sodium acetate, and the like. Further, the desired hydroxy-diazo compound can be obtained by treating a suspension of the dichlor-naphthylamin sulfo-acid in water with sodium nitrite in the absence of mineral acid, or the diazo compound is gradually formed by merely allowing the aqueous solution of the diazo compound first obtained to stand.

*Example 3—Production of a new azo dye using beta-naphthol as component.*—Prepare a concentrated solution of one hundred and fifty (150) parts of beta-naphthol in the requisite quantity of caustic soda and mix this solution with a solution of diazo compound such as can be obtained according to the foregoing example. Maintain the temperature at about sixty degrees centigrade (60° C.) for from three to four (3-4) hours. Then precipitate the coloring-matter by means of common salt. It is obtained as a dark powder which is easily soluble in water containing, say, one (1) per cent. of carbonate of soda, giving a brilliant blue solution. On the addition of dilute hydrochloric acid the solution becomes dirty red, and on the addition of caustic soda it turns blue-red. With concentrated sulfuric acid containing ninety-six (96) per cent. of $H_2SO_4$ a violet-blue solution results.

We claim—

1. The process of manufacturing azo coloring-matter, which consists in sulfonating the acetyl compound of 2.4-dichlor-1-naphthylamin, then splitting off the acetyl group, afterward diazotizing the 2.4-dichlor-1-naphthylamin sulfo-acid, converting this diazo compound into a hydroxy-chlor-diazo-naphthalene sulfo-acid and combining this body with beta-naphthol.

2. The process of manufacturing the hereinbefore-mentioned 2.4-dichlor-1-naphthylamin sulfo-acid, which consists in sulfonating the acetyl compound of 2.4-dichlor-1-naphthylamin and then splitting off the acetyl group.

3. The process of manufacturing azo coloring-matter, which consists in diazotizing the hereinbefore-mentioned 2.4-dichlor-naphthylamin sulfo-acid, converting this diazo compound into a hydroxy-chlor-diazo-naphthalene sulfo-acid and combining this body with beta-naphthol.

4. The new coloring-matter obtainable as hereinbefore described, which dissolves in water containing sodium carbonate, yielding a blue solution, which on the addition of hydrochloric acid becomes red, and on the addition of caustic soda turns blue-red, which dissolves in concentrated sulfuric acid, yielding a violet-blue solution, and which dyes wool brown-violet shades, which on treatment with bichromate of potash become blue-black.

In testimony whereof we have hereunto set our hands in the presence of two subscribing witnesses.

PAUL JULIUS.
SIEGFRIED HAECKEL.

Witnesses:
J. L. HEINKE,
JACOB ADRIAN.